US007536684B2

(12) United States Patent
Patrizio et al.

(10) Patent No.: US 7,536,684 B2
(45) Date of Patent: May 19, 2009

(54) SOFTWARE DOCUMENTATION GENERATION USING DIFFERENTIAL UPGRADE DOCUMENTATION

(75) Inventors: Jonathan Paul Patrizio, San Francisco, CA (US); Eric Martin Soderberg, Mountain View, CA (US); Michael S. Harkin, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 869 days.

(21) Appl. No.: 10/747,535

(22) Filed: Dec. 29, 2003

(65) Prior Publication Data

US 2005/0149920 A1  Jul. 7, 2005

(51) Int. Cl.
*G06F 9/44* (2006.01)
*G06F 12/00* (2006.01)
*G06F 17/20* (2006.01)

(52) U.S. Cl. .................. 717/170; 717/113; 717/123; 707/203; 715/229

(58) Field of Classification Search .................. 717/168, 717/160
See application file for complete search history.

(56) References Cited

U.S. PATENT DOCUMENTS 5,949,415 A    9/1999  Lin et al.
6,449,624 B1 *  9/2002  Hammack et al. .......... 707/203
6,473,855 B1   10/2002  Welder
6,610,103 B2 *  8/2003  Ehrman et al. .............. 715/511
6,610,104 B1 *  8/2003  Lin et al. ..................... 715/511
6,622,179 B2    9/2003  Welder
7,071,934 B1 *  7/2006  Faoro et al. ................. 715/229

OTHER PUBLICATIONS

"Mining Changes from Versions of Dynamic XML Documents", Rusu et al., Dec. 2006. Online retrieved at <www.springerlink.com/index/076r279456542546.pdf>.*

* cited by examiner

*Primary Examiner*—Tuan Q Dam
*Assistant Examiner*—Thuy Dao

(57) ABSTRACT

A software application includes a document generator. A user can download from an upgrade website documentation (e.g., release notes) describing the differences in operation between a post-upgrade version of the application that would result if a target upgrade is implemented and a pre-upgrade version of the application, e.g., the one available on the user computer system. The document generator can generate full documentation for the post-upgrade version from the pre-upgrade documentation and the upgrade documentation. The post-upgrade documentation has a revision display mode and a non-revision display mode, the former showing the changes from the operation of the pre-upgrade version to the operation of the post-upgrade version.

12 Claims, 3 Drawing Sheets

SOFTWARE DOCUMENTATION GENERATION USING DIFFERENTIAL UPGRADE DOCUMENTATION

BACKGROUND OF THE INVENTION

The present invention relates to computer software and, more particularly, to updating computer software. A major objective of the invention is to provide for more customized update prioritization to aid a user in selecting program updates for installation.

As computers have become pervasive in our society, computer software manufacturers compete aggressively for market share. For many, the objective is to get more features to the marketplace ahead of competitors. Of course, competition does not cease with the sale of a software product, as a competitor may subsequently introduce a competitive product with even more features. Newer versions with greater features sets are constantly being developed. To maintain customer loyalty between major version introductions, many computer manufacturers provide free or reduced-cost upgrades so that a purchaser can benefit from ongoing product development. For example, at least some upgrades can be made available on a vendor's website for downloading to a user's computer system.

When a software program license is first purchased, the software is often accompanied by user documentation, e.g., a user manual, which can be hardcopy and/or electronic, e.g., in Adobe portable document format (pdf). When the user receives a major upgrade, it is not atypical for it to be accompanied by new documentation that replaces the original documentation. However, it is less common for documentation to be replaced when a minor revision is implemented. Instead, minor revisions tend to be accompanied by release notes that describe the new features and any other changes implemented by the upgrade.

One of the reasons that it can be impracticable to replace documentation with every upgrade is that users may not implement all available upgrades. For example, if an available upgrade only provides features of no interest to a particular user, that user may skip that upgrade. If users are permitted to skip some upgrades while implementing others, there can be a wide variety of features sets that are implemented by different users. In such a case, it can be difficult to provide complete and integrated documentation for each possible combination of implemented upgrades.

To the extent that upgrades are accompanied by release notes instead of replacement documentation, a user may be required to refer to a user manual and all pertinent release notes to learn how to use a feature or to solve an encountered problem. This can be problematic even with one set of release notes in addition to the original documentation, and unwieldy if there are several pertinent sets of release notes. What is needed is a more effective way of documentation for upgrades.

SUMMARY OF THE INVENTION

The present invention provides for software generation of updated user documentation on a user computer system. The document generation can be performed by a documentation-generation module of the software being upgraded; alternatively, a distinct program co-located with the sprogram to be upgraded on the user computer system can perform the documentation generation. In either case, the documentation generation function accepts pre-upgrade documentation and differential ("new features") upgrade documentation as inputs, and then generates post-upgrade documentation as a function of these inputs.

Preferably, the documentation generator makes the new documentation available in a revision format so that the pre-upgrade and post-upgrade feature sets are readily compared. Optionally, electronic new documentation allows a user to switch between a revision view and a post-revision view that serves as documentation for a post-upgrade version without showing the changes. A further enhancement also allows a convenient switch to a pre-upgrade view for comparison purposes. A more sophisticated implementation of the invention uses a revision format to compare any pair of several available versions of a software program.

A major advantage of the invention is that a user has the benefit of integrated user documentation. The software manufacturer is relieved of the burden of providing different documentation sets for each possible combination of upgrades, while the user is relieved of the burden of downloading a full set of documentation with each upgrade. A further benefit is that the new documentation allows a user to see new features in context with the old features—this presentation format makes the benefits of the upgrade easier to evaluate. It also guides a user in referring to the documentation, since passages identified as unrevised can be scanned relatively quickly. Furthermore, a user considering a downgrade (to restore compatibility with other hardware and software that might have been lost because of an upgrade) can readily determine what features will be lost in the downgrade. These and other features and advantages of the invention are apparent from the description below with reference to the following drawings.

DETAILED DESCRIPTION

Figure 1:
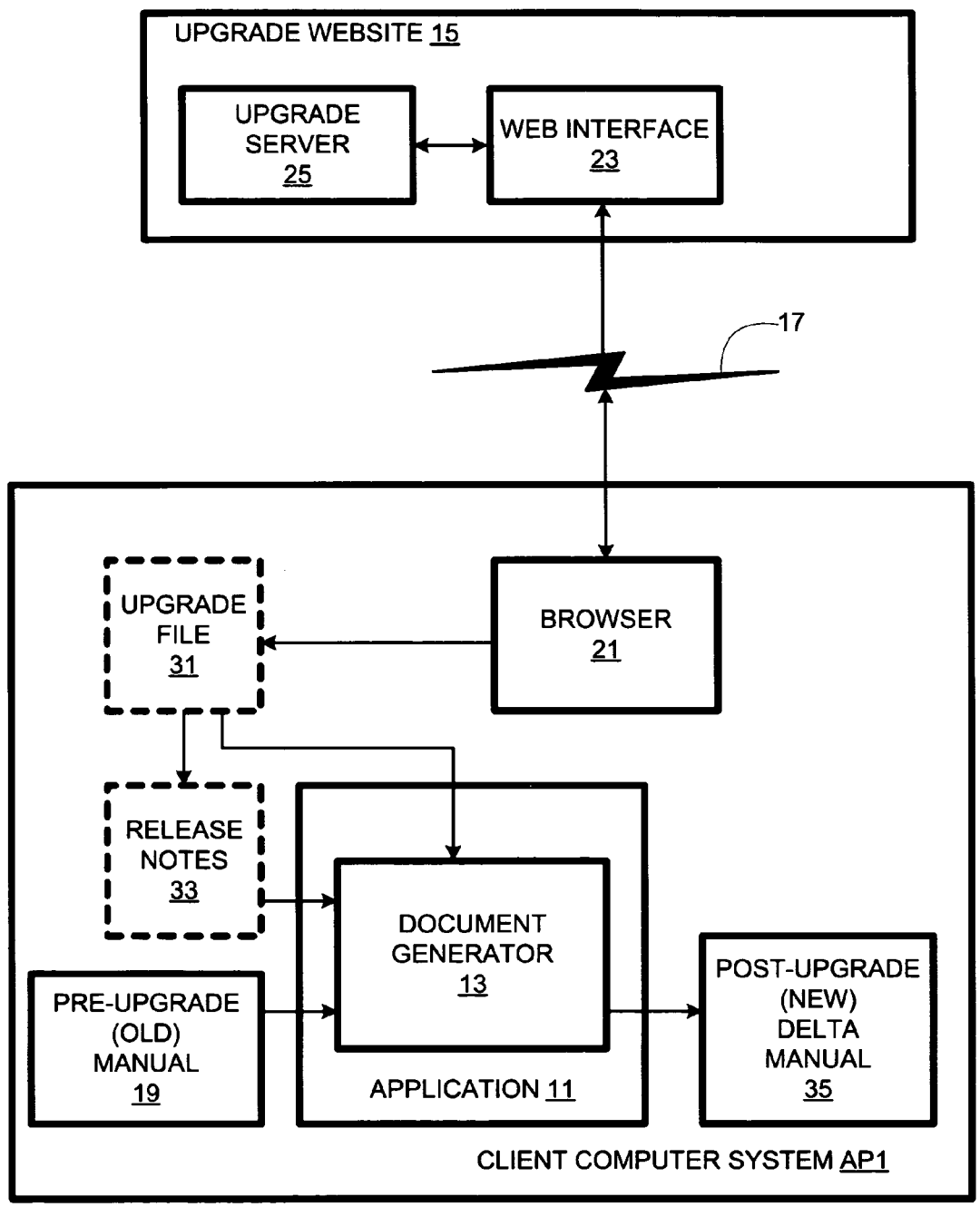
FIG. 1 is a schematic illustration of a vendor website and a user computer system in accordance with the present invention.
Figure 2:
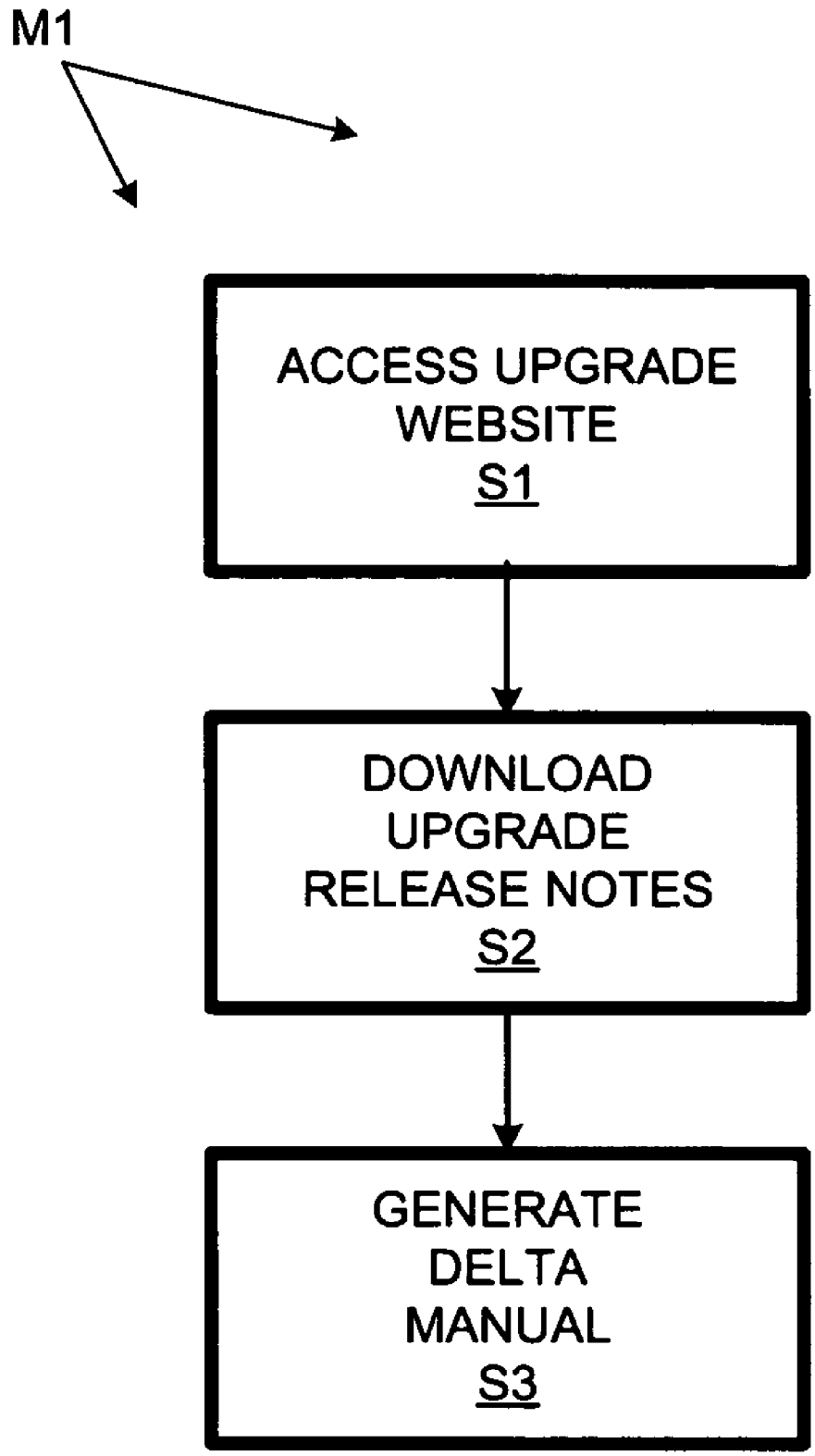
FIG. 2 is a flow chart of a method of the invention implemented in the context of the system shown in FIG. 1.

A user computer system AP1 for running a user application 11 with an integrated document generator 13 in accordance with the invention is shown connected to an upgrade website 15 via the Internet 17. An electronic pre-upgrade manual 19 for application 11 is also present on user computer system AP1. Also present on user computer system AP1 is a browser 21 for surfing the World-Wide Web.

In accordance with a method M1 of the invention, at a step S1, a user can access upgrade website 15 via the Internet using web browser 21. A web interface 23 provides an interface for an upgrade server 25 that provides upgrades and associated documentation, including release notes. The user can select upgrades and release notes for downloading at step S2. Alternatively, the invention provides for downloading release notes without the upgrade to aid the user in deciding whether to download a given upgrade.

A downloaded upgrade 31 and downloaded release notes 33 are shown in dash in FIG. 1. The user can then activate documentation generator 13 to generate post-upgrade delta manual 35 at step S3. Documentation generator 13 accesses electronic manual 15 and release notes 33, and uses the information so obtained to generate a new post-upgrade manual 35 for guiding a user in the use of a post-upgrade version of application 11.

Post-upgrade manual 35 is a "delta" manual in that it allows the user to compare the documentation for the pre-upgrade version of application 11 and the documentation for the post-upgrade version of application 11. More specifically, post-upgrade manual 35 describes the operation of the post-upgrade version of application 11 in revision format showing changes relative to pre-upgrade manual 15. Delta manual 35 includes a "delta-picker" panel 40 that allows a user to choose between viewing the new documentation in revision mode or in a "clean" mode. In the clean mode, the revision markings are absent so it is more readable, but the comparison information is absent.

Illustrated application 11 is a sample-playback application for musicians. It is designed to play back pre-recorded samples of real musical instruments in response to commands in MIDI (musical instrument digital interface) format. The commands can be generated in real time using an external MIDI keyboard (or other MIDI controller), or be generated as a pre-recorded sequence of MIDI commands is played back.

All versions of sample-playback application 11 store the samples on a hard disk of user computer system AP1. Since hard-disk access imposes unacceptable delays between note triggering and note sounding, all versions of application 11 require samples to be loaded into RAM prior to playback. Version 1.0 of sample playback application 11 requires entire samples to be loaded into RAM prior to triggering. Since RAM capacity tends to be much smaller than hard-disk capacity, this limitation severely constrains the total sample size (a function of the number of samples and their respective sizes in bits).

Version 1.1 of sample-playback application 11 provides for hard disk streaming. This is a technology that involves loading only a fraction of each required sample into RAM. Thus, the pre-loaded portion is available without hard-disk access. The remainder of the sample can be streamed into RAM as the pre-loaded portion plays. Using hard disk streaming, the total sample size is no longer limited by the amount of RAM, but by the available hard-disk capacity. However, the number of samples that can be pre-loaded is limited by the available RAM.

Version 1.2 of sample-playback application 11 introduces user configuration of hard disk streaming. More specifically, the user can adjust the fraction of sample required to be preloaded. This allows a customized tradeoff between the number of samples loaded and the proper playback of samples. Thus, if the hard disk is slow or if many other processes are accessing it during music production, a larger fraction can be selected, reducing the maximum number of samples available for playback. If hard disk performance is optimum, a smaller fraction can be selected, allowing more samples to be available for playback. However, due to differences in the way sample collections are encoded, a fraction that is large enough for some samples (e.g., those provided by or certified by the application manufacturer) may not be large enough for some third-party samples.

In an exemplary instance of method M1, version 1.0 is installed on user computer system 11. The user downloads (at step S2) the release notes for versions 1.1 and 1.2 to determine whether an upgrade is desired and, if so, whether the upgrade should be to version 1.1 or version 1.2. Once the release notes are downloaded, documentation generator 13 is run (at step S3) to generate delta manual 35.

Figure 3:
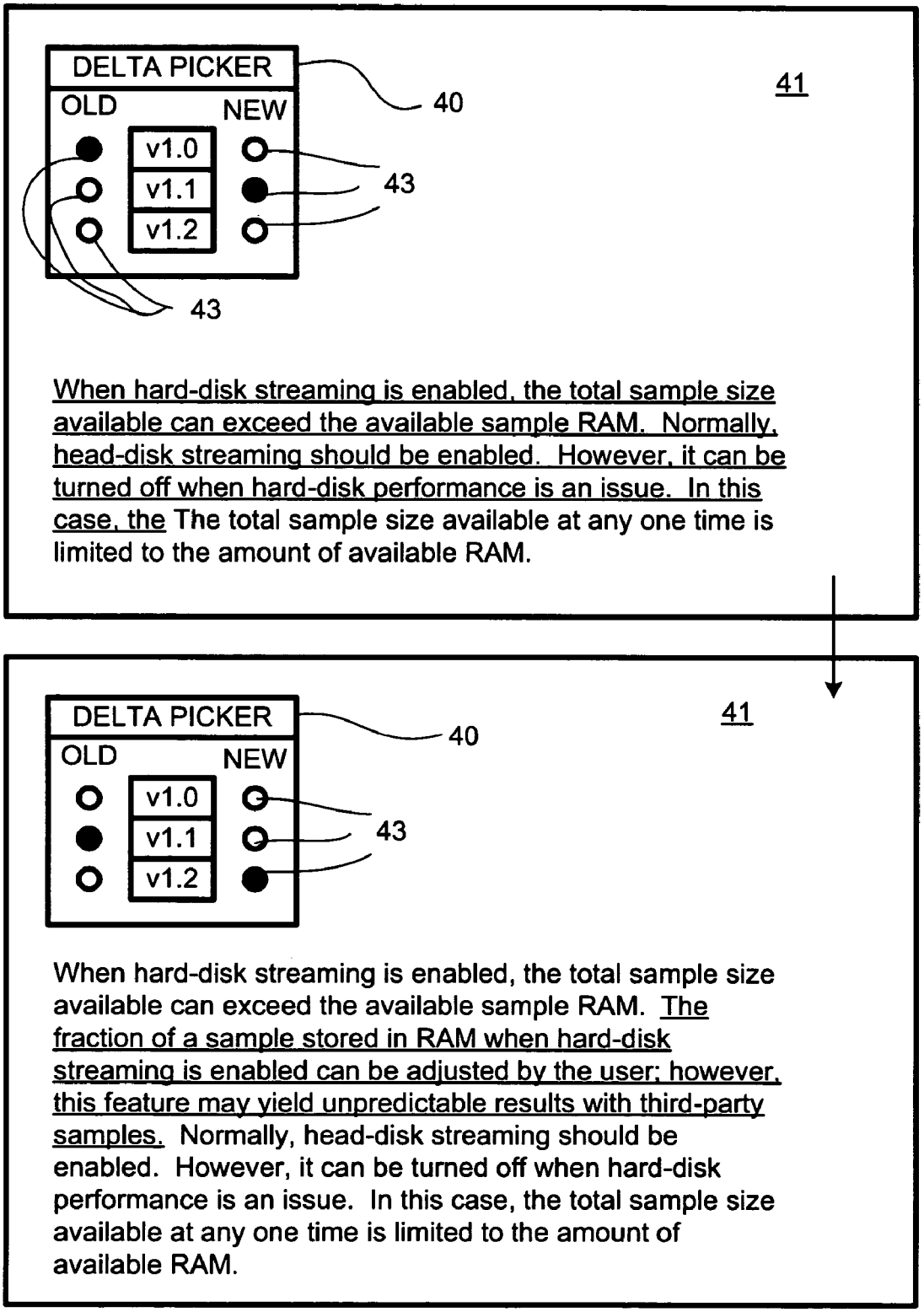
FIG. 3 is a schematic illustration of a revision-format passage for an exemplary user manual for a user program depicted in FIG. 1.

Delta manual 35 is a multi-page document, one page 41 of which is shown in FIG. 3. Delta-picker panel 40 is shown on every page. The user can click the radio buttons 43 in delta-picker panel 40 to select an "old" pre-upgrade version and a "new" post-upgrade version. Once old and new versions are selected, the manual (or at least the visible page of the manual) is shown in revision format: with the post-upgrade version shown as a modification of the pre-upgrade version of application 11.

At the top of FIG. 3, the user has selected version 1.0 as the old version and version 1.1 as the new version. Page 41 of post-upgrade manual 35 shows a change in documentation associated with the hard-disk recording feature is shown added to the user manual. The user can select radio buttons 43 for the same version as both old and new to see the manual without revision markings. The user then selects version 1.1 as the old version and version 1.2 as the new version, and the revision markings show the changes associated with the ability of a user to select the fraction of samples pre-loaded into RAM. The user can also select 1.0 as the old and version 1.2 as the new to view directly the documentation changes between those two versions. If version 1.1 is a prerequisite of 1.2, then the documentation shows the net result of both associated upgrades. Based on the comparisons provided by the manual, the user can decide to upgrade to version 1.1, to upgrade to version 1.2, or to not upgrade.

The invention further provides for selecting in delta-picker panel 40 a more recent revision as the "old" or source version and an earlier version as the "new" or target version. For example, selecting 1.2 as the old version and 1.1. as the new version would yield a page similar to the bottom one in FIG. 3 except that the underlined material would be struck out. Likewise, selecting 1.1 as the old and 1.0 as the new would yield a page similar to the top of FIG. 3 except that the underline material would be struck out and the struck out material would be underlined. Selecting versions in inverse order can be helpful in determining which upgrades should be uninstalled, e.g., to address compatibility or resource issues that arose with an upgrade.

The invention further provides for pair-wise comparisons of any number of available upgrades. Simpler embodiments may be more limited, e.g., only permitting one comparative view. In any event, provisions can be made for providing hardcopy printouts of both comparative and reconciled versions of user manuals. These and other variations upon and modifications to the detailed embodiments are provided for by the present invention, the scope of which is defined by the following claims.

What is claimed is:

1. A method comprising:

downloading from an upgrade Internet site to a user computer system upgrade documentation, said upgrade Internet site also providing for downloading upgrades for a pre-upgrade version of an executable application program, said upgrade documentation describing the differences in operation between a post-upgrade version of said application program and said pre-upgrade version, the operation of said pre-upgrade version being described by pre-upgrade documentation stored on said user computer system; and generating on said user computer system post-upgrade documentation for said application program by modifying said pre-upgrade documentation in accordance with said upgrade documentation, said post-upgrade documentation including a delta picker that a user can control to select between a clean format and a revision format of said post-upgrade documentation.

2. A method as recited in claim 1 wherein:
said revision format indicates differences in operation between said pre-upgrade version and said post-upgrade version.

3. A method as recited in claim 2 wherein:
said clean format does not indicate differences between said pre-upgrade version and said post-upgrade version.

4. A method as recited in claim 1 wherein said generating step is implemented by said pre-upgrade version of said application or said post-upgrade version of said application program.

5. A method as recited in claim 1 wherein said generating step is implemented by a program on said user computer system other than one of said versions of said application program.

6. Computer-readable storage media comprising:
a pre-upgrade version of an executable application program installed on a user computer system;
pre-upgrade electronic documentation for said application program installed on said user computer system; and
an executable documentation generator installed on said user computer system, said documentation generator generating post-upgrade documentation as a function of said pre-upgrade documentation and upgrade differential documentation associated with an upgrade of said application program, said post-upgrade documentation describing the operation of a post-upgrade version of said application program in the event said upgrade is implemented, said post-upgrade documentation including a delta picker that a user can control to select between a clean view and a revision view of said post-upgrade documentation.

7. Computer-readable storage media as recited in claim 1 further comprising upgrade software for implementing said upgrade and said upgrade documentation stored on said user computer.

8. Computer-readable storage media as recited in claim 1 wherein said post-upgrade documentation describes differences in the operation of said pre-upgrade version and said post-upgrade version.

9. Computer-readable storage media as recited in claim 8 wherein said post-upgrade documentation provides for revision-format comparisons between said pre-upgrade version and a third version of said application program.

10. Computer-readable storage media as recited in claim 9 wherein said post-upgrade documentation also provides for a clean format describing said third version of said application program.

11. Computer-readable storage media as recited in claim 1 wherein said document generator is integral with said application program.

12. Computer-readable storage media as recited in claim 1 wherein said document generator is a software program distinct from said application program.

* * * * *

UNITED STATES PATENT AND TRADEMARK OFFICE
CERTIFICATE OF CORRECTION

PATENT NO. : 7,536,684 B2  
APPLICATION NO. : 10/747535  
DATED : May 19, 2009  
INVENTOR(S) : Jonathan Paul Patrizio et al.

Page 1 of 1

It is certified that error appears in the above-identified patent and that said Letters Patent is hereby corrected as shown below:

In column 1, line 64, delete "sprogram" and insert -- program --, therefor.

In column 2, line 3, after "inputs." insert -- All software programs referred to herein are embodied in computer-readable media. --.

In column 6, line 5, in Claim 7, delete "claim 1" and insert -- claim 6 --, therefor.

In column 6, line 9, in Claim 8, delete "claim 1" and insert -- claim 6 --, therefor.

In column 6, line 21, in Claim 11, delete "claim 1" and insert -- claim 6 --, therefor.

In column 6, line 24, in Claim 12, delete "claim 1" and insert -- claim 6 --, therefor.

Signed and Sealed this

Twenty-ninth Day of December, 2009

David J. Kappos
*Director of the United States Patent and Trademark Office*